US009093242B2

(12) United States Patent
Manohara et al.

(10) Patent No.: US 9,093,242 B2
(45) Date of Patent: Jul. 28, 2015

(54) SYSTEMS AND METHODS FOR FABRICATING CARBON NANOTUBE-BASED VACUUM ELECTRONIC DEVICES

(71) Applicant: California Institute of Technology, Pasadena, CA (US)

(72) Inventors: Harish Manohara, Arcadia, CA (US); Risaku Toda, Glendale, CA (US); Linda Y. Del Castillo, Arcadia, CA (US); Rakesh Murthy, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 84 days.

(21) Appl. No.: 14/086,825

(22) Filed: Nov. 21, 2013

(65) Prior Publication Data

US 2014/0141686 A1    May 22, 2014

Related U.S. Application Data

(60) Provisional application No. 61/728,955, filed on Nov. 21, 2012.

(51) Int. Cl.
*H01J 9/18* (2006.01)
*B82Y 40/00* (2011.01)

(52) U.S. Cl.
CPC .. *H01J 9/18* (2013.01); *B82Y 40/00* (2013.01); *Y10S 977/939* (2013.01)

(58) Field of Classification Search
CPC ......... H01J 9/18; B82Y 40/00; Y10S 977/939
USPC .......... 445/35, 33, 50, 66; 313/495–497, 306, 313/309–310, 346, 351, 355, 293–304; 977/939; 423/447.1–447.9
See application file for complete search history.

(56) References Cited

U.S. PATENT DOCUMENTS 7,318,962 B2 *   1/2008   Long et al. .................... 428/566

| 7,834,530 | B2 | 11/2010 | Manohara et al. |
| 8,796,932 | B2 | 8/2014 | Manohara et al. |
| 2003/0036244 | A1 | 2/2003 | Jones et al. |
| 2003/0203139 | A1 | 10/2003 | Ren et al. |

(Continued)

FOREIGN PATENT DOCUMENTS

JP    2001143645 A    5/2001
JP    2008251548 A    10/2008

(Continued)

OTHER PUBLICATIONS

International Search Report and Written Opinion for International Application No. PCT/US2013/070420, Search Completed Feb. 27, 2014, 9 pgs.

(Continued)

*Primary Examiner* — Anne Hines
*Assistant Examiner* — Jose M Diaz
(74) *Attorney, Agent, or Firm* — KPPB LLP (57) ABSTRACT

Systems and methods in accordance with embodiments of the invention proficiently produce carbon nanotube-based vacuum electronic devices. In one embodiment a method of fabricating a carbon nanotube-based vacuum electronic device includes: growing carbon nanotubes onto a substrate to form a cathode; assembling a stack that includes the cathode, an anode, and a first layer that includes an alignment slot; disposing a microsphere partially into the alignment slot during the assembling of the stack such that the microsphere protrudes from the alignment slot and can thereby separate the first layer from an adjacent layer; and encasing the stack in a vacuum sealed container.

20 Claims, 12 Drawing Sheets

(56) References Cited

U.S. PATENT DOCUMENTS

| | | |
|---|---|---|
| 2005/0248256 A1 | 11/2005 | Song |
| 2006/0038299 A1 | 2/2006 | Hirakata et al. |
| 2006/0185595 A1 | 8/2006 | Coll et al. |
| 2007/0284089 A1 | 12/2007 | Vadakkanmaruveedu et al. |
| 2008/0061700 A1 | 3/2008 | Blick |
| 2008/0090183 A1 | 4/2008 | Zhu et al. |
| 2008/0180883 A1 | 7/2008 | Palusinski et al. |
| 2009/0136682 A1 | 5/2009 | Branton et al. |
| 2010/0009511 A1 | 1/2010 | Quinlan et al. |
| 2010/0019647 A1 | 1/2010 | Hao et al. |
| 2010/0085672 A1 | 4/2010 | Savin et al. |
| 2010/0140588 A1 | 6/2010 | Hongo |
| 2010/0141112 A1 | 6/2010 | Wang et al. |
| 2010/0264032 A1 | 10/2010 | Bazant |
| 2011/0057164 A1 | 3/2011 | Toda et al. |
| 2011/0101299 A1 | 5/2011 | Liang |
| 2011/0121227 A1 | 5/2011 | Keller et al. |
| 2013/0136860 A1 | 5/2013 | Chen et al. |
| 2013/0247678 A1 | 9/2013 | Manohara et al. |
| 2013/0249598 A1 | 9/2013 | Manohara et al. |
| 2013/0250479 A1 | 9/2013 | Manohara et al. |
| 2014/0148074 A1 | 5/2014 | Manohara et al. |

FOREIGN PATENT DOCUMENTS

| | | |
|---|---|---|
| WO | 2012019309 A1 | 2/2012 |
| WO | 2013142246 A1 | 9/2013 |
| WO | 2014078732 A1 | 5/2014 |
| WO | 2014081972 | 5/2014 |

OTHER PUBLICATIONS

International Search Report and Written Opinion for International Application No. PCT/US2013/071323, Search Completed Mar. 6, 2014, 11 pgs.

International Search Report and Written Opinion for International Application PCT/US2013/031285, completed Jun. 26, 2013, 9 pgs.

Chen, "Approximate Calculating Methods Concerning the Electron Transit Time for a Vacuum Microelectronics Triode," J. Phys. D: Appl. Phys 33 (2000) L39-L43.

Ghosh et al., "Nanodiamond lateral field emission vacuum logic OR gate", Electronics Letters, Aug. 4, 2011, vol. 47, No. 16, 2 pgs.

Grzybowski et al., "High Temperature Performance of Polymer Film Capacitors", Journal of Microelectronic Packaging, vol. 1, 1998, pp. 711-716.

Manohara et al., "Carbon Nanotube-Based Digital Vacuum Electronics and Miniature Instrumentation for Space Exploration", Proc. of SPIE vol. 7594, 75940Q-1.

Manohara et al., "Carbon Nanotube-Based High Temperature Vacuum Microelectronics for E&P Applications", SPE 156947, Jun. 12, 2012.

Manohara et al."11.2: "Digital" Vacuum Microelectronics: Carbon Nanotube-Gased Inverse Majority Gates for High Temperature Applications", IEEE, 2010, pp. 203-204.

Nusil Silicone Technology LLC, "Conductive Silicones in Elevated Temperatures", 5 pgs.

Sergent, "Discrete Passive Components for Hybrid Circuits, Chapter 8, 40 pgs."

Wacker, "High-Performance Silicones for Transmission and Distribution", 52 pgs.

Zhang et al., "Lateral vacuum microelectronic logic gate design", J. Micromech. Microeng., 1991, pp. 126-134.

International Search Report and Written Opinion for International Application No. PCT/US2013/071323, International Filing Date Nov. 21, 2013, Search Completed Mar. 6, 2014, Mailed Mar. 7, 2014, 11 pgs.

Manohara, Harish et al., "High-Current-Density Field Emitters Based on Arrays of Carbon Nanotube Bundles," Journal of Vacuum Science and Technology B, vol. 23 (1), pp. 157-61 (2005).

* cited by examiner

SYSTEMS AND METHODS FOR FABRICATING CARBON NANOTUBE-BASED VACUUM ELECTRONIC DEVICES

CROSS-REFERENCE TO RELATED APPLICATIONS

The current application claims priority to U.S. Provisional Application No. 61/728,955, filed Nov. 21, 2012, the disclosure of which is incorporated herein by reference.

STATEMENT OF FEDERAL FUNDING

The invention described herein was made in the performance of work under a NASA contract, and is subject to the provisions of Public Law 96-517 (35 U.S.C. 202) in which the Contractor has elected to retain title.

FIELD OF THE INVENTION

The present invention generally relates to the fabrication of carbon nanotube-based vacuum electronic devices.

BACKGROUND

Vacuum electronics is a broad term that typically references electronic devices that rely on the application of the principles of electron emission in the context of a vacuum. For example, diodes, triodes, tetrodes, and pentodes, can be fabricated as vacuum electronic devices. Recently, carbon nanotubes (CNTs) have been studied for their potential to provide for viable electron emitters within vacuum electronic devices. Specifically, carbon nanotubes exhibit a host of properties that would suggest that they could make for excellent field emitters, and can thereby enhance the functionality of vacuum electronic devices. Because of the numerous advantages that carbon nanotube-based vacuum electronic devices can confer, there exists a need to improve their manufacture such that they can be made to be more commercially viable.

SUMMARY OF THE INVENTION

Systems and methods in accordance with embodiments of the invention proficiently produce carbon nanotube-based vacuum electronic devices. In one embodiment a method of fabricating a carbon nanotube-based vacuum electronic device includes: growing carbon nanotubes onto a substrate to form a cathode; assembling a stack that includes the cathode, an anode, and a first layer that includes an alignment slot; disposing a microsphere partially into the alignment slot during the assembling of the stack such that the microsphere protrudes from the alignment slot and can thereby separate the first layer from an adjacent layer; and encasing the stack in a vacuum sealed container.

In another embodiment, assembling the stack includes using automatic or semi-automatic precision equipment to implement a pick and place assembly technique to assemble the stack.

In yet another embodiment, the stack further includes a further electrode.

In still another embodiment, the further electrode is one of: an extraction grid electrode, a gate electrode, and a focusing electrode.

In still yet another embodiment, the further electrode is one of an extraction grid electrode and a gate electrode, and the further electrode includes one of: micromachined silicon grids and electroformed metal mesh.

In a further embodiment, the further electrode includes electroformed metal mesh that is one of: a TEM grid and a standard filter mesh.

In a yet further embodiment, the stack further includes a dielectric layer.

In a still further embodiment, the dielectric layer is one of: a ring-shaped mica and a ring-shaped ceramic.

In a still yet further embodiment, the thickness of the dielectric layer is between approximately 10 μm and approximately 100 μm.

In another embodiment, the first layer houses one of: the cathode, the anode, the further electrode, and the dielectric layer.

In yet another embodiment, assembling the stack further includes affixing the spatial relationship of the layers and electrodes within the stack using one of: vacuum compatible epoxy, hard-mounting mechanical fixtures, and mixtures thereof.

In still another embodiment, encasing the stack in a vacuum sealed container includes placing the stack in a standard vacuum tube package, evacuating the vacuum tube package to high vacuums, and hermetically sealing the vacuum tube package.

In still yet another embodiment, encasing the stack in a vacuum sealed container includes using a solder reflow bonding technique.

In a further embodiment, disposing a microsphere partially into the alignment slot includes using an end effector to place the microsphere into the alignment slot.

In a yet further embodiment, the end effector is one of: vacuum tweezers and micromachined active grippers.

In a still further embodiment, assembling the stack further includes testing each layer of the stack for alignment accuracy.

In a still yet further embodiment, assembling the stack further includes attaching the cathode to an assembly platform using solder reflow or conductive epoxies that are vacuum compatible.

In another embodiment, the carbon nanotubes are grown onto a substrate including titanium.

In yet another embodiment, the grown carbon nanotubes are welded to the substrate.

In still another embodiment, the microsphere is disposed so as to help align the first layer with respect to an adjacent layer.

DETAILED DESCRIPTION

Turning now to the drawings, systems and methods for proficiently fabricating carbon nanotube-based vacuum electronic devices are illustrated. In many embodiments, fabricating a carbon nanotube-based vacuum electronic device includes utilizing microspheres in assembling the stack of the constituent components to precisely align them prior to sealing them in a vacuum encasing. In a number of embodiments, layers within the stack include alignment slots that that accommodate the microspheres, and thereby facilitate the aligning of the constituent components. In several embodiments, the alignment of the component layers are repeatedly assessed during the assembly process to ensure accuracy within tolerance. In this way, carbon nanotube-based vacuum electronic devices can be fabricated with a high degree of precision. Moreover, many of the aspects of the fabrication processes are amenable to automation, or at least semi-automation. Accordingly, the fabrication processes can be used to produce bulk quantities of carbon nanotube-based vacuum electronic devices with a high degree of precision.

Microscale digital vacuum electronic devices have been studied for their potential application in extreme environments, e.g. where conventional CMOS-based electronics may fail. For example, H. Manohara et al. disclose the manufacture of a microscale digital vacuum inverse majority gate (H. Manohara et. al., Proc. of SPIE, Vol. 7594, pp. 75940Q-1 to 75940Q-5 (2010)), that implements a fairly complex structure including three sets of field emitters, three distinct gate electrode structures dividing the three sets of field emitters, and an overlaying anode that is split into three corresponding sections. The anode is divided into three sections so that the area of overlap can be reduced, and the Miller capacitance can be decreased. In this way, the inverse majority gate can achieve high speed operation. H. Manohara et. al. propose that such a device can be suitable for operation in extraterrestrial environments because of its ability to maintain operation under extreme conditions. Proc. Of SPIE, Vol, 7594, pp. 75940Q-1 to 75940Q-5 (2010), by H. Manohara et. al. is hereby incorporated by reference.

Notably, in many instances, carbon nanotubes (CNTs) are relied on as an electron emission source in many microscale digital vacuum electronics as they can provide for many advantages. For instance, CNTs are amongst the strongest materials, as measured by tensile strength, and amongst the stiffest materials, as measured by elastic modulus. Additionally, CNTs have also been determined to possess outstanding electrical field emission properties, with high emission currents at low electric field strengths (e.g., applied field from 1-3 V/μm and an emission current ~0.1 mA from a single nanotube). Thus, CNTs are thereby attractive as cold-cathode field emission sources, especially for applications requiring high current densities (hundreds to thousands of amperes per cm2) and lightweight packages (high frequency vacuum tube sources). Indeed, in U.S. patent application Ser. No. 11/137,725 (issued as U.S. Pat. No. 7,834,530), Manohara et al. disclose particular configurations for a high density carbon nanotube-based field emitter that provide favorable performance characteristics. For example, Manohara et al. disclose that field emitters that include a plurality of bundles of CNTs disposed on a substrate, where the diameter of the bundles is between approximately 1 μm and 2 μm, and where the bundles of CNTs are spaced at a distance of approximately 5 μm from one another, demonstrate particularly advantageous performance characteristics. U.S. Pat. No. 7,834,530 is hereby incorporated by reference.

Unfortunately, the complexity of such structures can be disadvantageous from a fabrication perspective. Thus, H. Manohara et. al. proposed schemes for microscale digital vacuum electronics that are more conducive to fabrication in U.S. patent application Ser. No. 13/796,943 filed Mar. 12, 2013, the disclosure of which is hereby incorporated by reference. In particular, H. Manohara et. al. describe microscale digital vacuum electronics that do not require the use of a gate electrode. Still, in many instances, more complicated vacuum electronic devices that do require the use of a gate electrode may be required; consequently, fabrication challenges may still exist in these cases.

Importantly, although the inclusion of CNTs within microsale digital vacuum electronics can provide many advantages, the fabrication of CNT-based vacuum electronic devices can be challenging. For example, in many cases where CNT-based vacuum electronic devices that include multiple electrodes were fabricated using monolithic integration techniques, the utilized processing techniques were generally substantially process intensive and resulted in low yield. This can be attributed to the difficulty of fabricating such intricate devices, and also to the unique challenges that implementing CNTs pose. For example, it can be difficult to precisely govern the growth of CNTs, which is often the last step of the fabrication processes that are typically used. Additionally, the CNTs are prone to movement (and thereby can create short circuits), and as a result, great care must be taken to ensure the proper final alignment of the CNTs. Because of such fabrication challenges, it has generally been difficult to fabricate such CNT-based microscale electronic devices in bulk quantities.

Thus, many embodiments of the invention provide for more proficient fabrication processes that can address some of the above-mentioned deficiencies. For example, in many embodiments, the constituent components are individually fabricated, subsequently stacked, and thereafter sealed in a vacuum encasing. Importantly, components within the stack can include features and/or subcomponents to facilitate their precise aligning. Thus, many embodiments include alignment slots, whereby aligning features, such as microspheres, can be used to facilitate the aligning process.

Processes for fabricating carbon-nanotube based vacuum electronic devices are now discussed in greater detail below.

Processes for Fabricating Carbon Nanotube-Based Vacuum Electronic Devices

In many embodiments of the invention, the fabrication of CNT-based vacuum electronic devices is made to be efficient and, in many cases, conducive to the bulk manufacture of the devices. In numerous embodiments, the constituent components are individually manufactured, and thereafter assembled into a stack that is to be encased in a vacuum sealed container; in a number of embodiments, the stack includes features and/or subcomponents that facilitate alignment processes.

Figure 1:
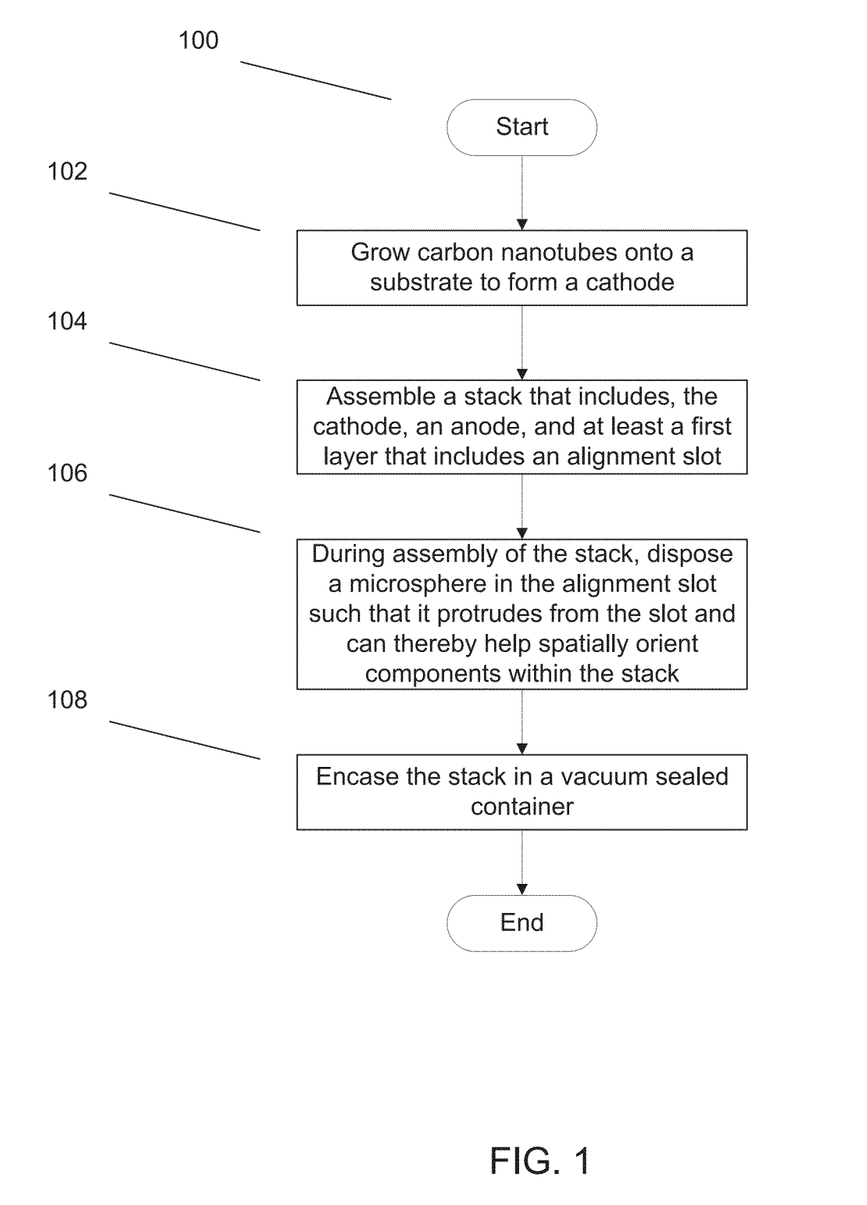
FIG. 1 illustrates a process for fabricating a carbon nanotube-based vacuum electronic device in accordance with embodiments of the invention.

A process for fabricating CNT-based vacuum electronic devices is illustrated in FIG. 1. The process 100 includes growing 102 carbon nanotubes onto a substrate to form a cathode. Any suitable technique for growing the CNTs may be implemented, and the CNTs may be grown in any suitable manner. For example, the CNTs may be grown in accordance with U.S. Pat. No. 7,834,530, incorporated by reference above; thus, they can be grown as a plurality of nanotube bundles disposed on a substrate, where the diameter of the bundles is between approximately 1 μm and approximately 2 μm, and where the CNT bundles are spaced at a distance of approximately 5 μm from one another. As explained in U.S. Pat. No. 7,834,530, such a configuration can yield favorable performance characteristics. Additionally, they can be grown in accordance with the guidance provided by U.S. patent application Ser. No. 14/081,932 to H. Manohara et. al., the disclosure of which is hereby incorporated by reference. U.S. patent application Ser. No. 14/081,932 discloses that robust carbon nanotube-based field emitters can be achieved by patterning a substrate with a catalyst, growing carbon nanotubes on the catalyst, and heating the substrate to an extent where it begins to soften such that at least a portion of at least one carbon nanotube becomes enveloped by the softened substrate. In this way, the carbon nanotubes can be well-adhered to the substrate. U.S. patent application Ser. No. 14/081,932 discloses that the substrate may include titanium; accordingly, in many embodiments of the instant invention, the substrate includes titanium. Of course, it should be understood that although several techniques for growing CNTs onto a substrate have been discussed, any suitable technique for doing so may be implemented in accordance with embodiments of the invention.

The process 100 further includes assembling 104 a stack that includes the cathode, an anode, and at least a first layer that includes an alignment slot. Generally, the stack can define the body of the CNT-based vacuum electronic device. The stack can further include any of a variety of constituent components in order to achieve the desired functionality of the CNT-based vacuum electronic device. For example, the stack can include an additional electrode, such as an extraction electrode, a gate/grid electrode, an accelerating electrode, and/or a focusing electrode; a dielectric layer; and/or layers that can house the components within the stack. Generally, a gate/grid electrode can allow a relatively small variation in voltage to cause a significantly large variation in the anode current. On the other hand, a focusing electrode can be used to increase the electron beam density, thereby increasing the current density, by focusing it onto an associated electrode that is within the stack. An extraction electrode can be used in association with a gate/grid electrode and can decrease the voltage required to modulate the current (e.g. ~<1V). By way of example, the extraction and/or gate electrodes can include one of: micromachined silicon grids (e.g. those developed at JPL) and electroformed metal mesh (e.g. TEM grids or standard filter mesh, such as those sold by commercial entities, such as BUCKBEE-MEARS, INC.). Additionally, the dielectric layer can be mica or other machinable ceramics. In some embodiments, the thickness of the dielectric layer is between approximately 10 μm and approximately 100 μm.

Importantly, the constituent components can be individually fabricated prior to assembly. In this way, each component may be customized so as to achieve desired characteristics. Thus, for example, the fabrication of each constituent component can implement fabrication techniques irrespective of those used for other components. Additionally, the individual components can be fabricated at a tailored level of precision. This level of flexibility can ultimately allow for the fabrication of more robust CNT-based vacuum electronic devices. Additionally, as the constituent components can be individually fabricated, they can be produced at a high level of fidelity (e.g. within a tightly specified tolerance). Where each constituent component is produced in accordance with a high fidelity level, the resulting CNT-based vacuum electronic device can be of higher quality.

The first layer that includes an alignment slot can be associated with any component in accordance with embodiments of the invention. For example, in some embodiments, the first layer that includes an alignment slot is a cathode holder. In a number of embodiments, the first layer that includes an alignment slot is a gate holder. In several embodiments, the first layer is the cathode substrate. In general, the first layer can be embodied by any component within the stack.

Figure 2:
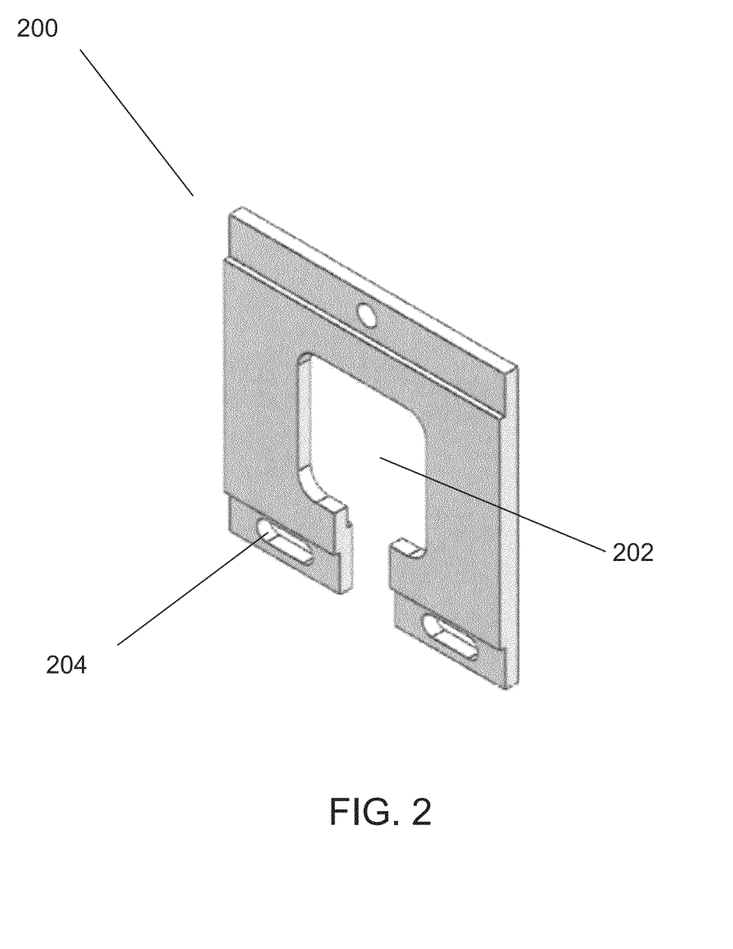
FIG. 2 depicts a holder that can be used to orient components within a stack in accordance with embodiments of the invention.

FIG. 2 depicts a holder that can be used to support components within a stack in accordance with embodiments of the invention. The holder can be used to support for example a cathode or a gate in accordance with embodiments of the invention. In the illustration, the holder 200 is shown including a carve out 202 for accommodating a component within the stack, and further including alignment slots 204 that can be used to facilitate the alignment of components within the stack. Of course it should be understood that the alignment slots 204 can be of any suitable shape, and are not restricted to the form factor depicted in FIG. 2.

Figure 3:
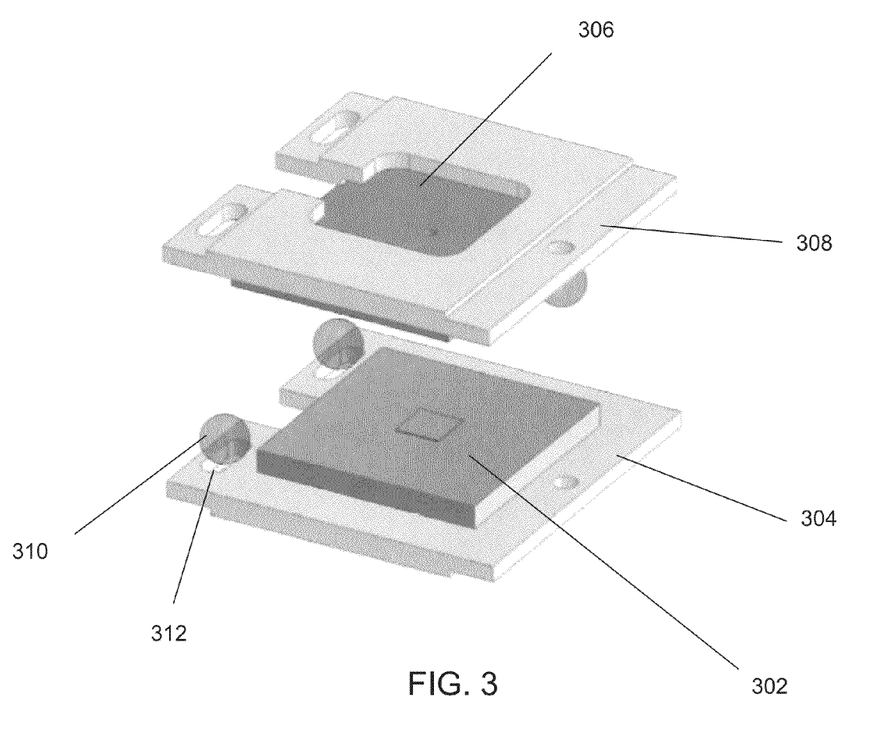
FIG. 3 illustrates the layering of triode hybrid microassembly stack in accordance with embodiments of the invention.

During the assembly of the stack, microspheres are disposed 106 within the alignment slots such that they protrude from the slot. In this way, they can help spatially orient components within the stack. FIG. 3 illustrates how microspheres may be disposed within alignment slots to spatially orient components within a stack that is used to form a triode in accordance with embodiments of the invention. In particular, the illustration depicts the layering of a cathode 302, a cathode holder 304, a gate 306, and a gate holder 308. As depicted in the illustration, microspheres 310 can be used to facilitate the proper alignment of the layers. In particular, it is illustrated that the microspheres 310 are disposed within the alignment slots 312, such that they protrude from them, and can thereby establish a desired separation distance between adjacent layers. In this way, microspheres can facilitate precision alignment. The microspheres can be deposited in the alignment slots using any suitable technique. In some embodiments, end effectors are used to install the microspheres. In many embodiments, the end effector is one of: vacuum tweezers and custom designed micromachined active grippers. Of course, any suitable technique for placing the microspheres may be implemented. It should also be noted that although microspheres are depicted and discussed, any suitable subcomponents can be used to facilitate precision aligning between the layers in the stack.

Figure 4:
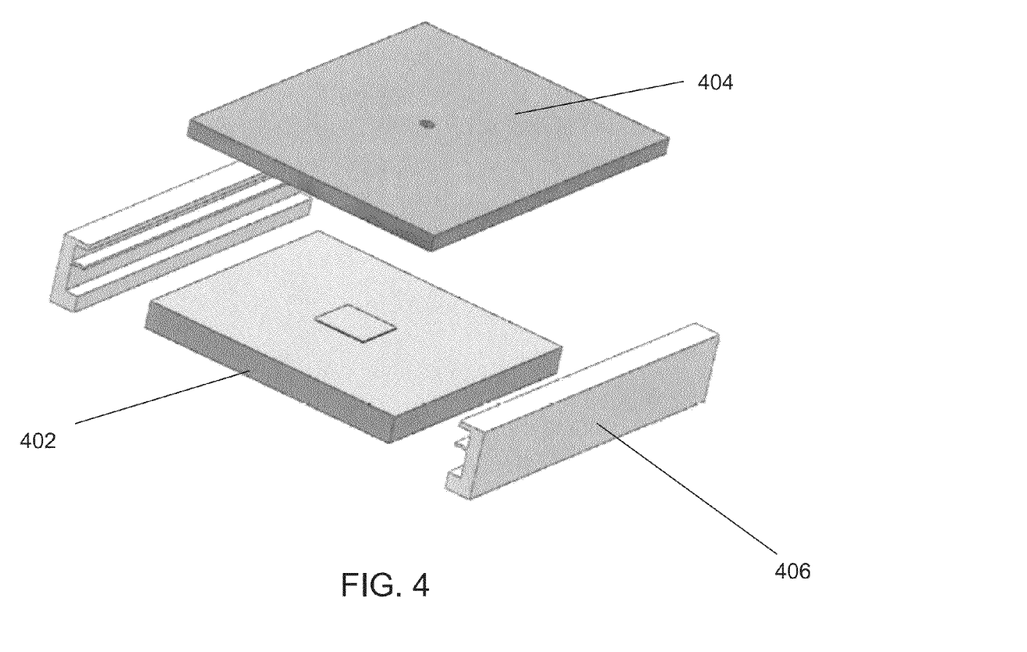
FIG. 4 illustrates the layering of a triode hybrid microassembly stack without the use of microspheres in accordance with embodiments of the invention.

In many embodiments, microspheres are not used to facilitate alignment, and instead, precision alignment is facilitated by components within the stack that include alignment slots. FIG. 4 depicts the layering of constituent components without utilizing microspheres in accordance with embodiments of the invention. In particular, a cathode substrate 402, and a gate 404, are aligned using plates with alignment slots 406.

In general, any compatible assembly techniques may be incorporated in accordance with embodiments of the invention. For example, in many embodiments, automation (and/or semi-automation) machinery can be used to facilitate the assembly of the stack. Thus, in many embodiments, a pick-and-place technique is used in conjunction with layering the constituent components to form the stack in accordance with embodiments of the invention. Automation and/or semi-automation can greatly facilitate the bulk manufacture of CNT-based vacuum electronic devices. In a number of embodiments the stack is affixed after assembly, and prior to final vacuum sealing. For example, in many embodiments, the stack is affixed using epoxy (e.g., UV-cured epoxy, or thermally cured epoxy). In a number of embodiments, the stack is affixed mechanically, e.g. using mechanical fasteners. In many embodiments, the constituent components are layered and affixed intermittently. Thus, for example, in some embodiments, a first and second constituent component within a stack are layered, and affixed to one another (e.g. via epoxy), prior to the inclusion of additional constituent components; where additional constituent components are added, they can be affixed to the stack prior to the addition of further constituent components. In a number of embodiments, the alignment of the stack is intermittently checked during assembly to verify the efficacy of alignment processes.

Figure 5A:
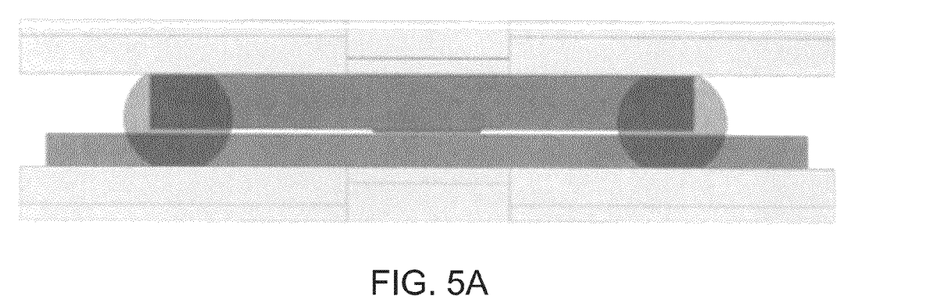
FIGS. 5A-5D illustrate a triode hybrid micro-assembly stack that can be assembled in accordance with embodiments of the invention.
Figure 5B:
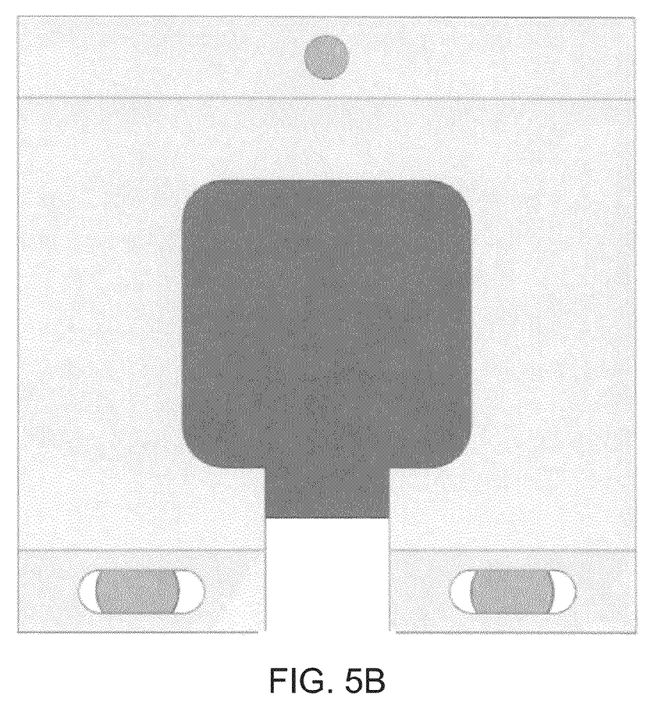
Figure 5C:
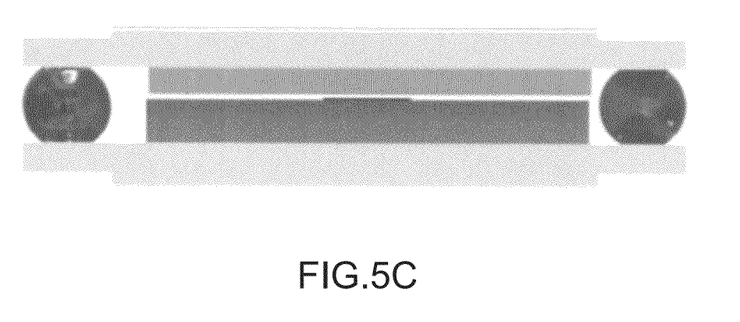
Figure 5D:
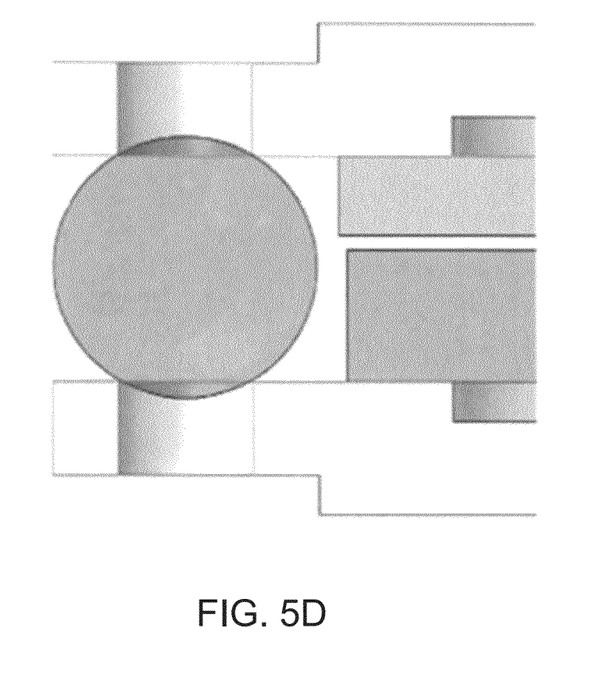

FIGS. 5A-5D depict the assembled stack previously shown in FIG. 3 to be implemented in the fabrication of a CNT-based triode vacuum electronic device in accordance with embodiments of the invention. In particular, FIG. 5A depicts a front view, FIG. 5B, depicts a top view, FIG. 5C depicts a side view, and FIG. 5D depicts a cross-sectional view of the assembled stack.

Figure 6:
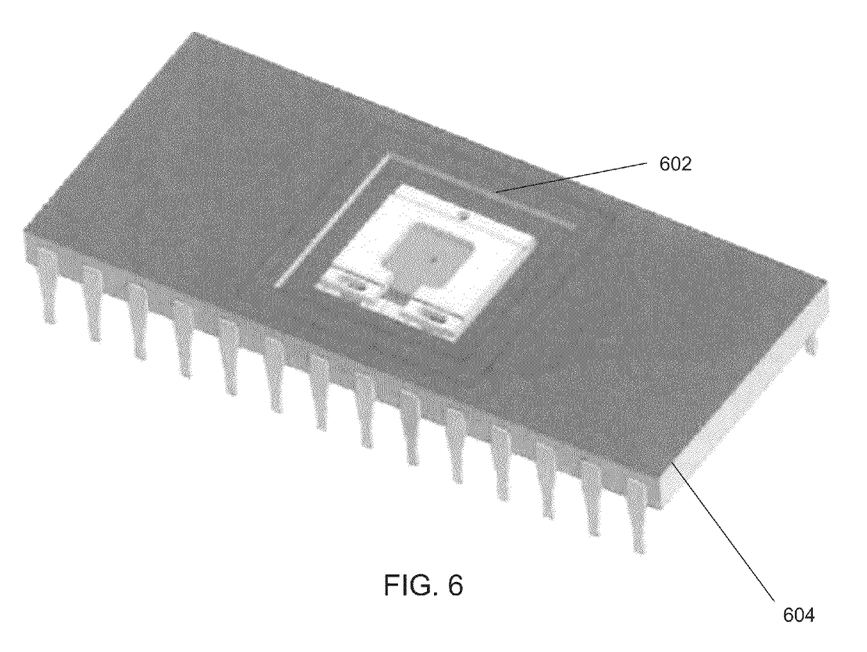
FIG. 6 illustrates a DIP that can be implemented in accordance with embodiments of the invention.

The assembly of the stack can be associated with any suitable base underlying substrate. For example, in many embodiments, the cathode substrate is affixed to an assembly platform using solder reflow or conductive epoxies that are vacuum compatible. In numerous embodiments, solder reflow bonding is used to affix the stack to conventional packages, such as leadless chip carrier (LCC) packages and dual in-line packages (DIP). The bonding of a stack to a conventional package can include using solvent and/or O2 plasma to clean the package in a vacuum at 400° C. for 3 days, and attaching the stack to the package using 2 mm² $Au_{80}Sn_{20}$ preform. FIG. 6 depicts a stack that is adhered to a DIP. More specifically, the stack 602 is depicted as being bonded to the DIP 604.

Figure 7:
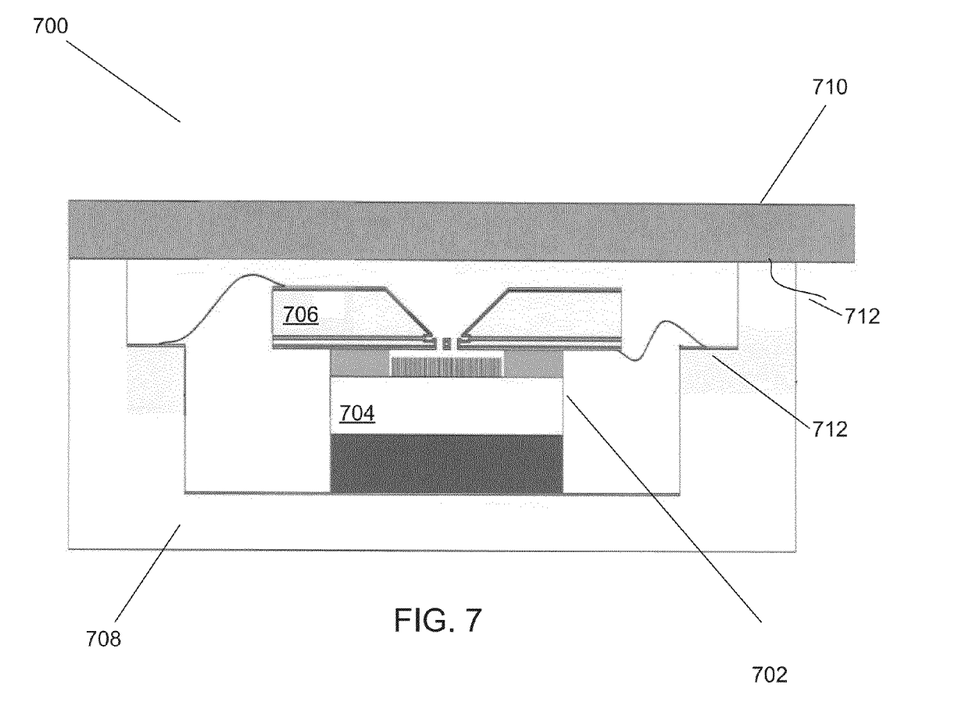
FIG. 7 illustrates a schematic for the testing of an assembly stack that has been assembled in accordance with embodiments of the invention.

After assembly, the stack may be tested to ensure viability prior to being encased in a vacuum sealed package. FIG. 7 depicts a testing rig that can be used to test a stack that has been adhered to dual in-line packages in accordance with embodiments of the invention. In particular, the testing rig 700 includes a stack 702, that itself includes a cathode 704 and a grid electrode 706, that is bonded to a dual in-plane package, and further includes an anode 710. Wire bonded contacts 712 are electrically coupled to the grid and the anode to allow for the testing of the stack.

The stack can be encased 108 in a vacuum sealed container. Any suitable encasing technique may be implemented. For example, in some embodiments, the stack is placed in a standard vacuum tube package, creating the vacuum (to a desired extent) within the package, and thereafter hermetically sealing the vacuum tube package. In many embodiments a solder reflow bonding technique is implemented in conjunction with encasing the stack in a vacuum-sealed container. In many embodiments, a getter is incorporated in the vacuum tube package to preserve the vacuum.

In some embodiments, the encasing is accomplished by: baking the stack (which may be bonded to a corresponding package) for 96 hours at 200° C. and $10^{-6}$ torr; firing the getter at less than 400° C., using IR shutters to protect the vacuum tube encasing from heating; cooling the lid to 300° C.; and soldering the lid at 300° C. and $10^{-6}$ torr. Although of course, any suitable encasing technique may be used in accordance with embodiments of the invention.

Figure 8A:
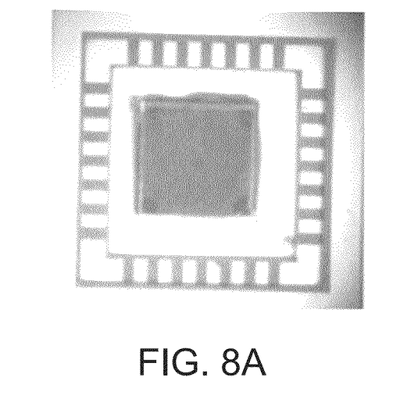
FIGS. 8A-8F illustrate using a UV-Cured Epoxy to affix the spatial relationship of the components within a diode hybrid microassembly in accordance with embodiments of the invention.
Figure 8B:
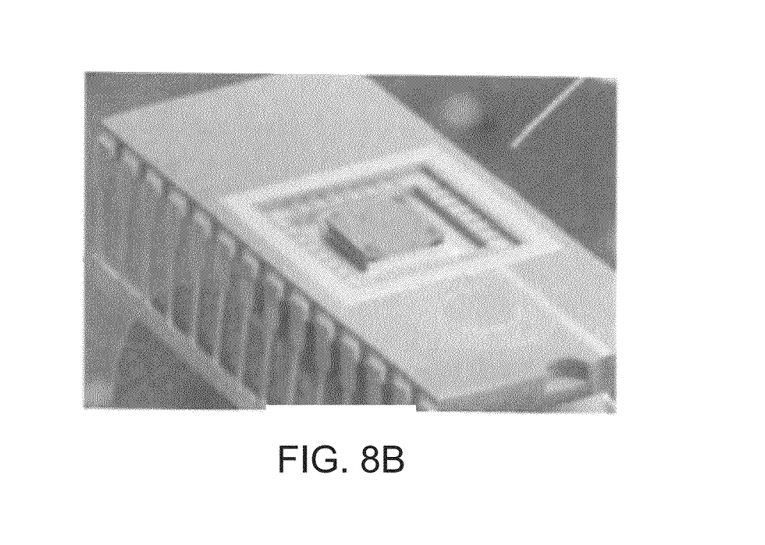
Figure 8C:
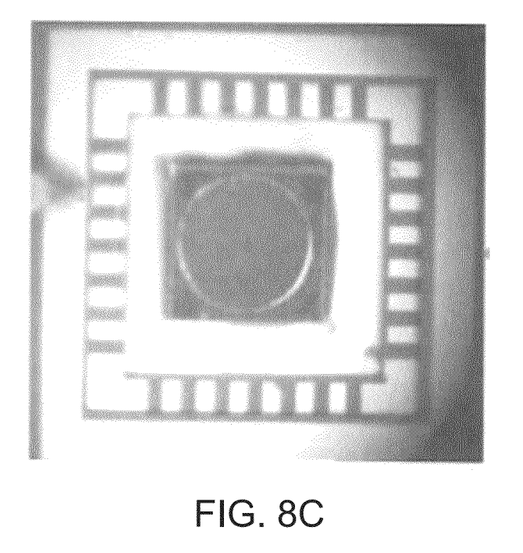
Figure 8D:
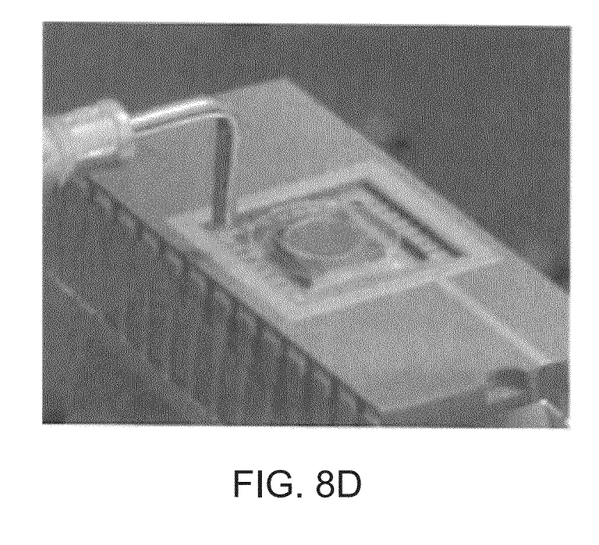
Figure 8E:
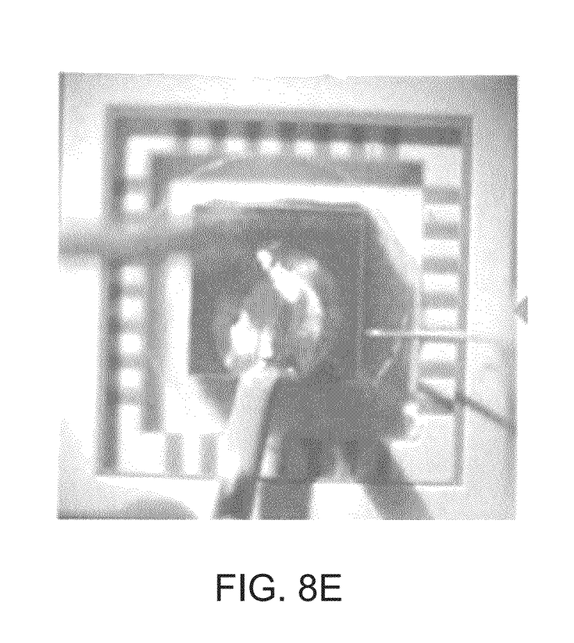
Figure 8F:
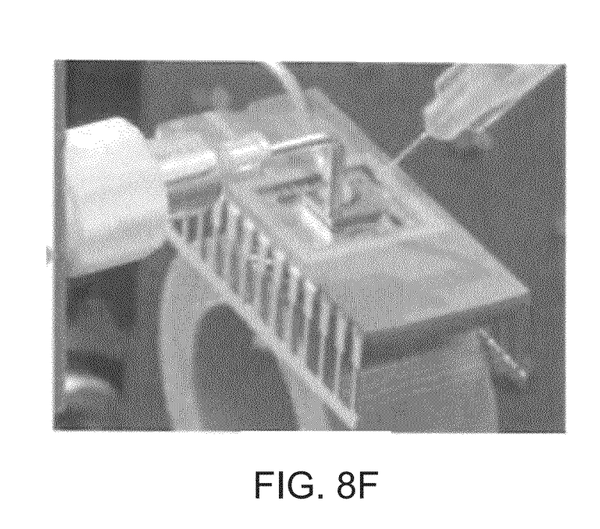

The scope of the invention may be further understood with respect to the following examples regarding proficient fabrication processes for the fabrication of CNT-based vacuum electronic devices in accordance with embodiments of the invention. In particular, FIGS. 8A-8F regard fabrication processes that implement UV-cured Epoxy to affix the constituent components of a diode to one another to form a stack to be encased in a vacuum. More specifically, FIGS. 8A-8B depict the dispensing of UV-cured epoxy on a cathode. FIGS. 8C-8D depict the subsequent deposition of a mica spacer on the epoxy-coated cathode. FIGS. 8E-8F depict the subsequent deposition of an anode, which is affixed to the mica spacer using UV-cured epoxy.

Figure 9A:
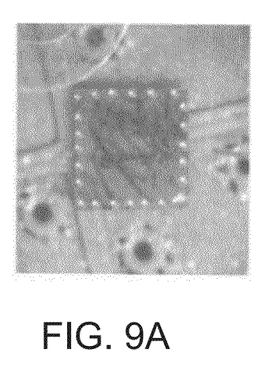
FIGS. 9A-9F illustrate using thermal-cured epoxy to affix the spatial relationship of the components within a diode hybrid microassembly in accordance with embodiments of the invention.
Figure 9B:
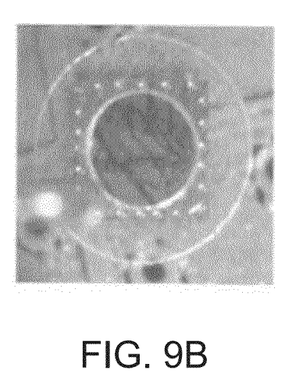
Figure 9C:
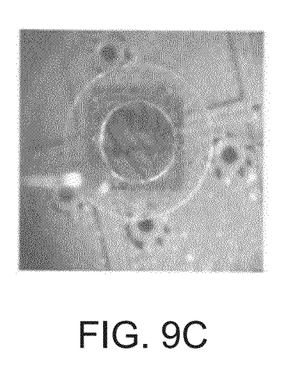
Figure 9D:
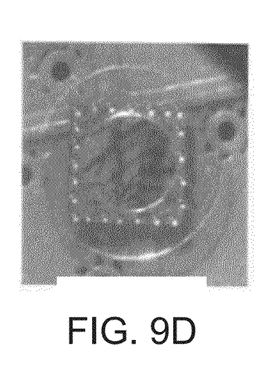
Figure 9E:
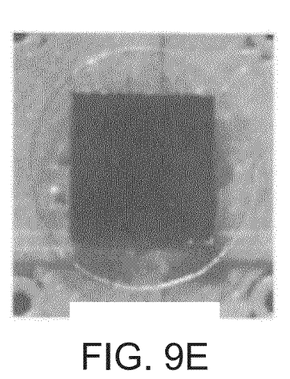
Figure 9F:
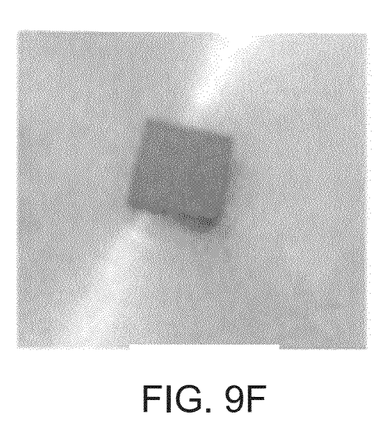

Similarly, FIGS. 9A-9F depict the assembly of a stack to be used as the foundation for a CNT-based diode vacuum electronic device, using thermal-cured epoxy. In particular, FIG. 9A depicts the deposition of MC7880 dots on the cathode; FIG. 9B depicts the deposition of the mica spacer on the cathode; FIG. 9C depicts the adhering of the mica spacer to the cathode; FIG. 9D depicts the deposition of MC7880 dots onto the mica spacer; FIG. 9E depicts the adhering of the anode to the mica spacer; and FIG. 9F depicts curing the diode assembly on a hot plate.

Of course, it should be understood that the above described examples are meant to be illustrative and not exhaustive. Any suitable techniques for affixing the constituent components within a stack may be implemented in accordance with embodiments of the invention may be implemented. More generally, it should be understood that the above described systems and methods are meant to be illustrative. In general, as can be inferred from the above discussion, the above-mentioned concepts can be implemented in a variety of arrangements in accordance with embodiments of the invention. For instance, the above-described processes are not restricted to the fabrication of diodes and triodes; any suitable CNT-based vacuum electronic device can be fabricated in accordance with embodiments of the invention. For example, tetrodes and pentodes can be fabricated. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A method of fabricating a carbon nanotube-based vacuum electronic device, comprising:
   growing carbon nanotubes onto a substrate to form a cathode;
   assembling a stack comprising:
     the cathode;
     an anode; and
     a first layer that includes an alignment slot;
   disposing a microsphere partially into the alignment slot during the assembling of the stack such that the microsphere protrudes from the alignment slot and can thereby separate the first layer from an adjacent layer; and
   encasing the stack in a vacuum sealed container.

2. The method of claim 1, wherein assembling the stack comprises using automatic or semi-automatic precision equipment to implement a pick and place assembly technique to assemble the stack.

3. The method of claim 2, wherein the stack further comprises a further electrode.

4. The method of claim 3, wherein the further electrode is one of: an extraction grid electrode, a gate electrode, and a focusing electrode.

5. The method of claim 4, wherein the further electrode is one of an extraction grid electrode and a gate electrode, and wherein the further electrode comprises one of: micromachined silicon grids and electroformed metal mesh.

6. The method of claim 5, wherein the further electrode comprises electroformed metal mesh that is one of: a TEM grid and a standard filter mesh.

7. The method of claim 3, wherein the stack further comprises a dielectric layer.

8. The method of claim 7, wherein the dielectric layer is one of: a ring-shaped mica and a ring-shaped ceramic.

9. The method of claim 7, wherein the thickness of the dielectric layer is between approximately 10 µm and approximately 100 µm.

10. The method of claim 7, wherein the first layer houses one of: the cathode, the anode, the further electrode, and the dielectric layer.

11. The method of claim 7, wherein assembling the stack further comprises affixing the spatial relationship of the layers and electrodes within the stack using one of: vacuum compatible epoxy, hard-mounting mechanical fixtures, and mixtures thereof.

12. The method of claim 11, wherein encasing the stack in a vacuum sealed container comprises placing the stack in a standard vacuum tube package, evacuating the vacuum tube package to high vacuums, and hermetically sealing the vacuum tube package.

13. The method of claim 11, wherein encasing the stack in a vacuum sealed container comprises using a solder reflow bonding technique.

14. The method of claim 7, wherein disposing a microsphere partially into the alignment slot comprises using an end effector to place the microsphere into the alignment slot.

15. The method of claim 13, wherein the end effector is one of: vacuum tweezers and micromachined active grippers.

16. The method of claim 7, wherein assembling the stack further comprises testing each layer of the stack for alignment accuracy.

17. The method of claim 7, wherein assembling the stack further comprises attaching the cathode to an assembly platform using solder reflow or conductive epoxies that are vacuum compatible.

18. The method of claim 7, wherein the carbon nanotubes are grown onto a substrate comprising titanium.

19. The method of claim 18, wherein the grown carbon nanotubes are welded to the substrate.

20. The method of claim 7, wherein the microsphere is disposed so as to help align the first layer with respect to an adjacent layer.

* * * * *